United States Patent Office 3,721,708
Patented Mar. 20, 1973

3,721,708
PROCESS FOR THE PREPARATION OF
o-PHTHALIC ACID
Ferdinand List, Johann Dodt, and Helmut Alfs, Marl, Germany, assignors to Chemische Werke Huels, A.G., Marl, Germany
No Drawing. Filed Dec. 11, 1969, Ser. No. 884,371
Claims priority, application Germany, Dec. 14, 1968, P 18 13 707.4
Int. Cl. C07c 63/02, 63/18
U.S. Cl. 260—524 R  10 Claims

ABSTRACT OF THE DISCLOSURE

The preparation of phthalic acid by the oxidation of o-xylene in the presence of a carboxylic acid and a bromine compound is improved by conducting the oxidation in the presence of phthalic anhydride to react with at least some of the water of the reaction, thereby reducing the heat energy required to remove the water from the reaction mixture.

BACKGROUND OF THE INVENTION

This invention relates to a process for the production of phthalic acid by the catalytic liquid-phase oxidation of o-xylene with air, in a carboxylic acid, in the presence of a heavy metal compound and a bromine compound.

It has been known since Loder (U.S. Pat. 2,245,528) that xylenes can be oxidized with air in lower carboxylic acids, in the presence of certain heavy metal compounds, to obtain the corresponding toluic acids and phthalic acids. In accordance with Henke (U.S. Pat. 2,276,774), the process is advantageously conducted in the additional presence of a barium compound or a lead compound, with the barium bromides and lead bromides recited, inter alia, by Henke, providing optimum results since hydrogen bromide promotes the complete oxidation to the phthalic acids. See also U.S. Pat. 2,415,800 and German Pat. 10,918.

In accordance with a process not known in the prior art, which process is disclosed in U.S. patent application Ser. No. 773,349, filed on Nov. 4, 1968 an improvement over the prior art is achieved, especially with respect to the granular size of the thus-obtained phthalic acids, by employing a cobalt compound as the soluble heavy metal compound, and utilizing sufficient excess air so that the waste gas contains free oxygen. In that process, a phthalic acid yield of 94% of theory is obtained, calculated on the o-xylene charged and the phthalic acid produced exhibits an acid number of 670 (theory: 674) and a melting point of 187–188° C. (literature: 191° C.). This acid can readily be converted into a phthalic anhydride in accordance with a process not heretofore known in the art, by heating in the presence of small amounts of an entraining agent. Phthalic anhydride produced by that process, in the crude form, has a saponification number of 735 (theory: 757) and a melting point of 127° C. (literature: 131° C.) and results in a product meeting technical specifications after a simple distillation.

The liquid-phase oxidation with a subsequent conversion of the phthalic acid to phthalic anhydride requires 83 kg. of o-xylene to produce 100 kg. of phthalic anhydride and thus is more advantageous than the vapor-phase oxidation which requires 108 kg. of o-xylene. Another advantage is the high radical concentration in the liquid phase, which permits a high reaction rate even at a low temperature and results in a more uniform product. Also, the use of a diluent, i.e., a reaction solvent, results in a considerable increase in selectivity. Finally, the very high amounts of excess air required in the gas phase process are not required, no complicated devices for temperature control are required, and the high heat of reaction can readily be removed by way of the heat of vaporization of the boiling reaction solvent.

The boiling lower carboxylic acid serving as the reaction diluent removes, together with the exhaust gas, the water of reaction formed in the reactor, together with a small amount of xylene. This mixture suitably is conducted through a reflux condenser and then condensed in a cooling system connected thereafter, preferably at a pressure of 8–10 atmospheres gauge. The waste gas is expanded into the atmosphere and the condensed lower carboxylic acid reaction solvent, water, and unreacted xylene are expanded into the carboxylic acid feed column, in which the water and the o-xylene is distilled overhead, e.g., at a reflux ratio of about 10. The distillate is condensed, and the o-xylene fraction is recycled back to the oxidation reactor. The aqueous fraction is discarded. The carboxylic acid which condenses in the sump is returned to the oxidation process.

This azeotropic distillation method of removing the water of reaction from the carboxylic acid has the disadvantage that it requires substantial heat energy, so that the larger part of the energy requirements of the total process is required at this point. In contrast thereto, the energy requirement for the oxidation stage is low, since the heat of oxidation can be used for steam generation.

Accordingly, it would be desirable to reduce the energy necessary for the removal of the water of reaction.

SUMMARY OF THE INVENTION

In accordance with this invention, the high energy requirements heretofore required for the removal of the water of reaction are eliminated by conducting the oxidation in the presence of up to 2.5 times by weight of phthalic anhydride, calculated on the weight of o-xylene.

DETAILED DESCRIPTION OF THE INVENTION

The oxidation is accomplished in a conventional manner, using oxidation catalysts described in Loder (U.S. Pat. 2,245,528, col. 2, lines 3–27). In this connection, manganese and cobalt compounds, e.g., the salts thereof with inorganic or organic acids, are especially suitable. Preferably, soluble salts are employed, e.g., acetates, octoates or naphthenates. The cobalt compounds are preferred, with cobalt acetate being used with special advantage.

The catalyst is generally employed in a concentration of 1 to 10 g., preferably 2 to 6 g. per liter.

A suitable bromine compound is an inorganic compound, such as, for example, $BaBr_2$, $PbBr_2$, $CoBr_2$, HBr, $NH_4Br$, KBr, etc., or an organic bromine compound, such as, for example, ethyl bromide, ethylene bromide, bromoform, xylyl bromide, xylylene bromide, etc. $BaBr_2$ or KBr is preferably employed, e.g., in such amounts that the content of organically or inorganically bound bromine is about 0.5 to 10 g., especially 1.5 to 4 g., per liter.

The air required for the oxidation is preferably metered so as to ensure the reaction mixture always contains an excess of oxygen. This is accomplished with certainty if the waste gas contains an excess of oxygen at all times, preferably an excess of at least 2% by volume, especially 2–4% by volume.

The reaction can be conducted in any desired vessel which permits vigorous mixing. Preferably, the apparatus known from German patent application DAS 1,168,887 is employed. The reaction can be conducted continuously or batch-wise.

The reaction is conducted in a lower carboxylic acid, as the reaction solvent, i.e., one containing 2 to 6, preferably 2 to 4 carbon atoms, especially acetic acid, which is separable from the o-phthalic acid reaction product, e.g., by distillation of the solvent or crystallization of the o-phthalic acid therefrom.

The phthalic anhydride is used in amounts of up to 2.5 times the weight of the o-xylene employed in the reaction which are sufficient to react with a substantial amount of the water of reaction.

Preferably, 1 to 2, and most preferably 1.5, times by weight of phthalic anhydride is employed, calculated on the weight of o-xylene.

Although the reaction can be conducted under conditions which cause all, or substantially all of the water of reaction to react with the phthalic anhydride, preferably the conditions are selected which cause only that amount of the water of reaction to react which requires an excessive amount of heat energy to remove with and separate from the reaction solvent. Generally, reacting about half of the water of reaction with phthalic anhydride in a continuous reaction will suffice to reduce drastically the heat energy required to separate the water from the reaction solvent distilled therewith.

It is highly surprising that the liquid-phase oxidation of o-xylene can be conducted in the presence of a lower carboxylic acid and a heavy metal compound and bromine compound, in the additional presence of high concentrations of phthalic anhydride.

Each mol of phthalic anhydride binds one mol of water of reaction, which therefore no longer need be separated by the energy-consuming carboxylic acid-water distillation. Rather, this water can be removed by converting the o-phthalic acid to phthalic anhydride, for example in accordance with the process by heating in the presence of small amounts of an azeotropic agent, which requires substantially less energy than removal by distillation.

In a preferred embodiment of this process, a portion of the phthalic anhydride obtained during the above-mentioned conversion of the o-phthalic acid to phthalic anhydride is recycled to the oxidation tower for removal of further water of reaction. The overall reaction, when one molar equivalent of phthalic anhydride is recycled, can be represented by the following equation:

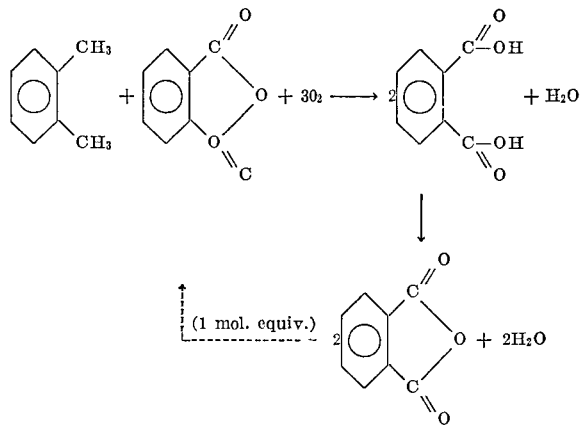

When about 1.5 times by weight of phthalic anhydride is employed, calculated on the weight of the o-xylene (ca. one molar equivalent), one molar equivalent of phthalic anhydride is circulating internally. With one molar equivaent circulating internally, twice as much phthalic acid is converted to phthalic anhydride but only half is removed as product.

Although the amount of phthalic acid converted to phthalic anhydride is doubled in the process of this invention, the overall energy requirement of the process is less than is required to azeotropically remove the water of reaction by distillation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A 5-liter tower is employed, corresponding to the apparatus described in DAS 1,168,887. The tower is equipped with a lateral circulation, a high-pressure steam heater, an air feed inlet, a reflux condenser, a safety valve, and an oxygen metering device in the exit gas duct. Such a tower is described in U.S. Pat. 3,313,849, too.

500 g. of o-xylene is dissolved in 3,500 g. of acetic acid and 750 g. of phthalic anhydride, 20 g. of cobalt acetate and 10 g. of potassium bromide are added thereto.

At a temperature of 160° C. and an air load of 4 m.³/hr. and a pressure of 10 atmospheres gauge, the oxidation is complete within 60 minutes. In the waste gas, there is always 2–4% by volume of $O_2$. The reaction mixture is discharged and cooled to room temperature. The thus-precipitated o-phthalic acid is separated by filtration, washed, and dried. There is thus isolated 1.438 g. of o-phthalic acid having an acid number of 670 (theory: 674). Another 140 g. of o-phthalic acid remains dissolved in the mother liquor. In the acetic acid mother liquor, there is 79 g. of $H_2O$, corresponding to about 47% of the water of reaction formed during the oxidation. The mother liquor from the above-described batch-type operation can be reused as the reaction solvent for further oxidation charges after removal of the water of reaction. In this connection, the water of reaction is separated as follows: In a distillation apparatus with a reflux condenser, the mother liquor is heated, optionally with the addition of o-xylene; an azeotrope of water, o-xylene and acetic acid is withdrawn. This mixture is then conventionally separated into its components in a suitable column.

Advantageously, the oxidation, as well as the separation of the water of reaction by distillation are conducted in a fully continuous manner, a portion of the liberated heat of oxidation being utilized for distilling out the acetic acid-water mixture.

EXAMPLE 2

As described in Example 1, the oxidation is initiated in a batch operation and then, after about 30 minutes, converted into a continuous operation, as follows:

Using a plunger-type metering pump, 500 g./hr. of o-xylene and 750 g./hr. of phthalic anhydride are introduced into the tower. By reducing the reaction pressure to about 5–8 atmospheres gauge, the thus-formed water of reaction is discharged together with the acetic acid and traces of o-xylene over the head of the reactor, the amount of distillate being controlled in a simple manner by regulating the flow of cooling water in the reflux condenser. The overhead distillate is collected and then worked up by distillation in a column. The dried acetic is recycled into the process. In order to obtain anhydrous acetic acid, a relatively high reflux ratio, e.g., about 1:10, must be set in the distillation step.

In order to isolate the phthalic acid formed in the oxidation reactor, part of the oxidation mixture is continuously withdrawn from the bottom of the tower, and cooled. The thus-precipitated phthalic acid is then centrifuged and washed. The thus-obtained mother liquor is returned to the tower. Desirably, the required amounts of phthalic anhydride and catalyst are simultaneously introduced therewith. The yield obtained in this continuous oxidation corresponds to that of discontinuous operation, i.e., the yield of phthalic acid is 94% of theory, based on the o-xylene charged.

EXAMPLE 3

In the manner described in Example 2, o-phthalic acid is produced which is converted to phthalic anhydride by heating it in the usual manner with or without the addition of an azeotropic agent. The latter process may be performed in a way which does not belong to the prior art whereby a melt of phthalic anhydride containing only a very small amount of azeotroping agent is maintained at a temperature of from 160° to 200° C. Phthalic acid is introduced into the melt, and an azeotropic mixture of water and azeotroping agent is withdrawn therefrom. The withdrawn azeotroping agent is separated from the water in the azeotropic mixture and return to said melt. This process is disclosed in German patent application P 18 13 391.0, filed on Dec. 7, 1968.

The thus-produced phthalic anhydride is returned to the oxidation step at a rate 1.5 times the rate o-xylene is fed to the reaction tower.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of o-phthalic acid by the catalytic liquid-phase oxidation of o-xylene with air in a lower carboxylic acid, in the presence of a heavy metal compound and a bromine compound, which comprises conducting the oxidation in the presence of a cobalt compound as the heavy metal compound and from 1 to 2.5 times by weight of phthalic anhydride, calculated on the weight of o-xylene and at all times of sufficient oxygen to maintain oxygen in the exit gas.

2. A process according to claim 1, wherein the lower carboxylic acid is acetic acid.

3. A process according to claim 1, wherein the heavy metal compound is cobalt acetate.

4. A process according to claim 1, wherein the sole heavy metal compound is a cobalt compound and the process is conducted in the presence at all times of a stream of air in an amount sufficient to maintain at least 2% by volume of oxygen in the exit gas.

5. A process according to claim 4 wherein the oxidation is conducted in the presence of 1 to 2 times by weight of phthalic anhydride.

6. A process according to claim 5 wherein the oxidation is conducted in the presence of about 1.5 times by weight of phthalic anhydride.

7. A process according to claim 4 comprising the steps of converting the o-phthalic acid produced in the oxidation to phthalic anhydride and recycling a portion of the phthalic anhydride thus produced to the oxidation step as the source of phthalic anhydride used therein.

8. A process according to claim 7 wherein the oxidation is conducted in the presence of 1 to 2 times by weight of phthalic anhydride.

9. A process according to claim 8 wherein the oxidation is conducted in the presence of about 1.5 times by weight phthalic anhydride.

10. A process according to claim 8 wherein the oxidation is conducted in acetic acid and in the presence of a cobalt salt of an organic acid and with about 2–4% by volume of oxygen at all times in the exit gas.

References Cited

UNITED STATES PATENTS

| | | | |
|---|---|---|---|
| 2,833,816 | 5/1958 | Saffer et al. | 260—524 |
| 2,727,919 | 12/1955 | Saunders | 260—524 |
| 2,853,514 | 9/1958 | Brill | 260—524 |
| 2,789,988 | 4/1957 | Brown et al. | 260—346.7 |
| 2,962,361 | 11/1960 | Spiller et al. | 260—524 |

HENRY R. JILES, Primary Examiner

R. S. WEISSBERG, Assistant Examiner

U.S. Cl. X.R.

260—346.7